United States Patent [19]

Mallet

[11] 4,325,593
[45] Apr. 20, 1982

[54] COMPOSITE BEARING HAVING DEFORMABLE WASHER

[75] Inventor: Bernard Mallet, Limay, France
[73] Assignee: Nadella, France
[21] Appl. No.: 162,749
[22] Filed: Jun. 25, 1980
[30] Foreign Application Priority Data
Jun. 27, 1979 [FR] France .............................. 79 16516
[51] Int. Cl.$^3$ ...................... F16C 19/32; F16C 27/08
[52] U.S. Cl. .................................. 308/163; 308/212; 308/DIG. 3
[58] Field of Search ................. 64/17 A; 308/35, 163, 308/173, 184 R, 207 R, 210, 212, 216, DIG. 3

[56] References Cited

U.S. PATENT DOCUMENTS

3,950,834  4/1976  Pitner .............................. 308/163 X

Primary Examiner—Frederick R. Schmidt

Attorney, Agent, or Firm—Robert E. Burns; Emmanuel J. Lobato; Bruce L. Adams

[57] ABSTRACT

A composite bearing comprises a cup having a set of antifriction bearing elements around its inner wall, and a deformable washer disposed at the bottom of the cup. The washer comprises a body portion having a stud projecting outwardly from one side thereof and having a recess in the other side thereof opposite the stud. When the composite bearing is mounted on the end of a shaft, the shaft end pushes the stud inwardly towards the body portion and the stud deforms inwardly to at least partly fill the recess. The deformed pushing of the stud in the recess effectively reduces the reaction force exerted by the washer against the end face of the shaft and eliminates play between the bearing and shaft thereby reducing slapping of the end of the shaft against the bottom of the bearing cup.

9 Claims, 5 Drawing Figures

COMPOSITE BEARING HAVING DEFORMABLE WASHER

BACKGROUND OF THE INVENTION

The present invention relates generally to composite bearings which support radial and axial loads and more particularly to such bearings comprised of a cup having cylindrical antifriction bearing elements disposed about the inner sidewall of the cup and having a deformable washer arranged between the bottom of the cup and the face of the shaft which bears against the inner raceway of the set of antifriction bearing elements.

There are already known bearings of this type which have washers of plastic material of very different shape intended, on the one hand, to support axial loads and, on the other hand, to obtain, after deformation, mounting of the bearing on the end of a shaft. These known bearing constructions, however, all suffer the drawbacks of giving rise either to exerting a strong reaction force or to having too much play both of which result in a slapping of the end of the shaft against the bottom of the cup.

SUMMARY OF THE INVENTION

The primary object of the present invention is, therefore, to eliminate the foregoing drawbacks by providing a bearing having a washer which makes it possible to obtain mounting of the bearing on the end of a shaft without slapping and which exerts a lower reaction force than prior art bearings of similar type.

Another object of the invention is to provide a bearing having a washer comprised of a substantially central stud which, after being pushed-in during mounting of the bearing, fills, at least in part, a recess provided in the body of the washer.

A further object of the invention is to provide a bearing having a washer in the general shape of a cap having a body portion on one side of which is the recess and from the other side of which projects the stud.

Other advantages, features and characteristics of the invention will become evident in the course of the following description of various applications and embodiments and which is given solely by way of example and in which the invention is described with reference to the accompanying drawings.

DETAILED DESCRIPTION OF INVENTION

Figure 1:
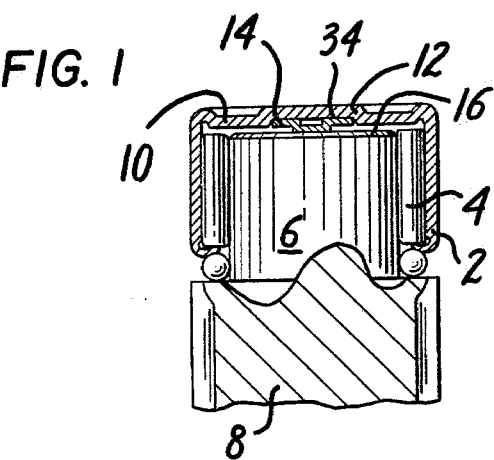
FIG. 1 is a cross-sectional view of the bearing of the invention shown in connection with a roller box.

FIG. 1 shows in cross section a combined radial-and-axial bearing in the state before the pressing operation which brings the bearing to final size and shape. The combined bearing comprises a radial bearing formed of a cup 2, which may be machined or of stamped plate, having around its inner sidewall a set of cylindrical antifriction roller elements 4. The inner raceway of the bearing is borne by a shaft formed by a journal 6 of a spider 8 of a cardan joint, and the bottom 10 of the bearing has a shoulder 12 for use in centering a deformable washer 14 (see FIGS. 3 to 5) of a diameter substantially less than that of the journal. The deformable washer 14 is preferably made of synthetic material of low coefficient of friction and is positioned facing the central portion of the end face 16 of the journal 6 in order to support axial forces exerted by the journal.

Figure 2:
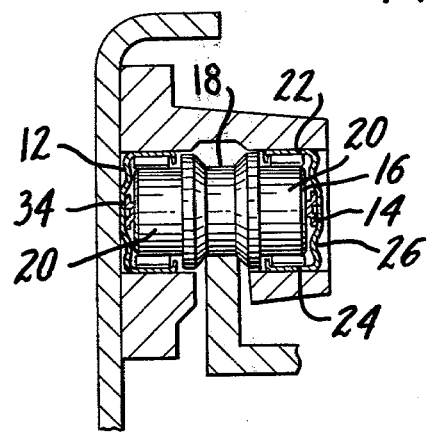
FIG. 2 is a cross-sectional view of the bearing of the invention shown in connection with a roller box.

FIG. 2 shows in cross section, after being brought to size, the combined bearing of the invention in connection with a roller box of the type described in detail in British Pat. No. 1,180,838 in the name of the same applicant and in which the roller 18 comprises two journals 20 supported radially by rings of cylindrical antifriction rolling elements 22 arranged within cups 24 forming a radial bearing. Each cup 24 has a bottom 26 which is provided with a centering shoulder 12 against which bears a deformable washer 14. A portion of the washer 14 rests against the end face of the journal and by its deformation, assures mounting of the bearing with the desired tolerances and in operation, bears axial forces exerted by the journal.

Figure 3:
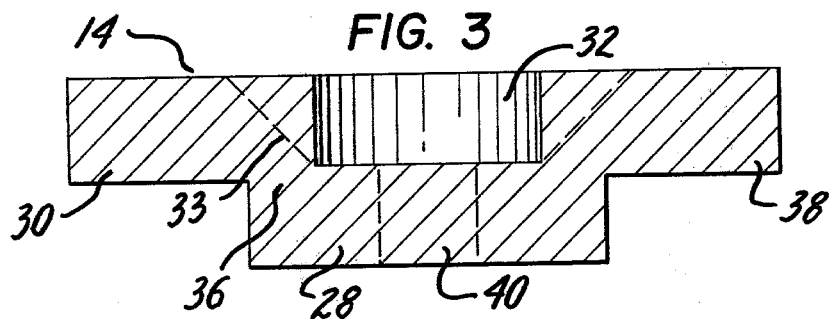
FIGS. 3, 4 and 5 each show different embodiments of the plastic washer inserted in the bearings of FIGS. 1 and 2 before deformation of the washer.

FIG. 3 shows on an enlarged scale a first embodiment of the washer 14 of the composite bearings of FIGS. 1 and 2. The washer has the general shape of a cap comprised of a body portion having a stud 28 projecting outwardly from one side thereof for bearing against the end face 16 of the journal and having a substantially flat edge 30 surrounding an inner recess 32 for fitting within and pressing against a complementary shaped portion 34 of the bottom of the cup defined by the centering shoulder 12.

The stud and edge portions have substantially the same thickness and are connected by a slightly narrow portion 36 which, upon the mounting of the journal 6, facilitates the at least partial pushing of the stud 28 into the recess 32 (see FIG. 2), which pushing may be accompanied, if desired, by a shearing at the level of the narrow portion 36 and/or a raising of the outer rim 38 from the edge 30, thereby proportionally decreasing the friction.

The volume of the stud 28 is capable of completely filling the recess 32 upon inward deformation of the stud. Both the stud and recess have substantially straight sides which are, respectively, perpendicular to the resting surfaces provided on the end face 16 of the journal and the portion 34 of the bottom of the cup.

In order to facilitate the pushing in of the stud upon mounting, the inner wall 33 of the recess 32 can be formed with a conical shape flared towards the edge 30, or a throughbore 40 can be formed in the body of the stud 28, as shown by dotted lines in FIG. 3.

Figure 4:
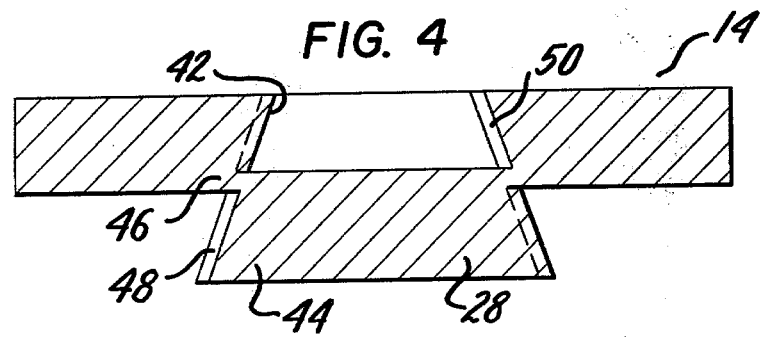

The embodiment of FIG. 4 shows a washer 14 in which the inner wall 42 of the recess is substantially conical and is located substantially along a conical extension of the outer surface 44 of the stud 28. The recess is disposed over a shearable narrow portion 46, which is narrower than the narrow portion 36 of the FIG. 3 embodiment, thus permitting an easier pushing of the stud into the recess, if necessary after shearing at the level of the shearable narrow portion 46.

Figure 5:
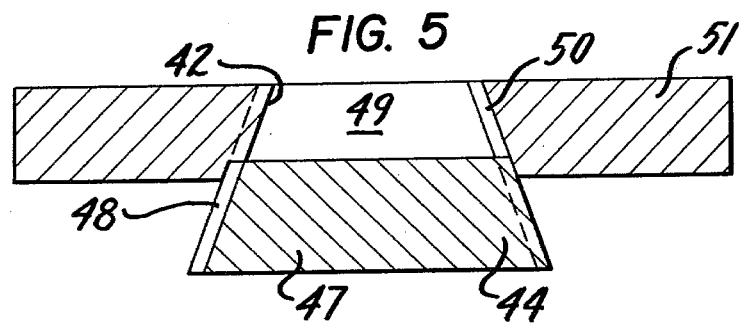

In the embodiment of FIG. 5, the washer is formed in two pieces comprised of a conical stud piece 47 capable upon mounting of insertion with a force fit into a central recess 49 of complementary shape provided in a substantially flat body portion piece 51 in an arrangement similar to that of FIG. 4 except that the connecting portion 46 is eliminated.

In the FIG. 4 and FIG. 5 embodiments, the fitting of the stud in the recess is facilitated by the cooperation of two systems of complementary grooves 48, 50 formed, respectively, on the surface 44 of the stud and on the inner wall 42 of the recess parallel to the generatrices of the latter.

Furthermore, the mounting of the washer in the cup can be reversed in such a manner that the edge (30, 51) of the body portion rests against the end face 16 of the journal and the stud (28, 47) rests on the portion of the bottom of the cup which, in this instance, would have a shoulder dimensioned for centering the stud.

It is also possible to provide a central imprint on the face of the spider intended to assure the centering of the stud or the edge of the washer.

The invention is by no means limited to the applications and the embodiments which have been described and shown but also covers all obvious modifications and variations thereof which fall within the spirit and scope of the appended claims.

What I claim is:

1. In a composite bearing of the type comprised of a cup having a set of antifriction bearing elements, and a deformable washer disposed at the bottom of the cup for bearing against the end face of a shaft during use of the composite bearing, the improvement wherein said washer comprises a body portion having a stud projecting outwardly from one side thereof and having a recess in the other side thereof opposite said stud, said stud and recess being configured so that said stud deforms inwardly and is pushed in towards said body portion to at least partly fill said recess during mounting of the composite bearing and shaft.

2. A composite bearing according to claim 1; wherein said body portion and stud have substantially the same thickness.

3. A composite bearing according to claim 1 or 2; further including a narrow portion connecting said stud to said body portion.

4. A composite bearing according to claim 1 or 2; wherein at least one of said stud and recess has straight sidewalls perpendicular to the end face of the shaft.

5. A composite bearing according to claim 1 or 2; wherein at least one of said stud and recess has conical sidewalls tapering in the direction from said stud toward said recess.

6. A composite bearing according to claim 5; wherein the sidewall of said recess is located along an extension of the sidewall of said stud.

7. A composite bearing according to claim 5; further including a shearable narrow portion connecting said stud to said body portion.

8. A composite bearing according to claim 5; wherein said stud and recess have complementary grooves to facilitate fitting of said stud in said recess during inward deformation of said stud.

9. A composite bearing according to claim 1; wherein said washer comprises two separate pieces, one piece being said stud and the other piece being said body portion, and wherein said recess extends completely through said body portion and said stud is force fit in said recess thereby connecting said stud to said body portion.

* * * * *